United States Patent
Vermunt et al.

(10) Patent No.: US 8,660,131 B2
(45) Date of Patent: Feb. 25, 2014

(54) STORAGE UNIT FOR COMMUNICATION SYSTEM NODE, METHOD FOR DATA STORAGE AND COMMUNICATION SYSTEM NODE

(75) Inventors: Franciscus Maria Vermunt, Waalre (NL); Antonius Maria Vos, Geldrop (NL); Patrick Willem Heuts, Oosterbeek (NL)

(73) Assignee: NXP B.V., Eindhoven (NL)

( * ) Notice: Subject to any disclaimer, the term of this patent is extended or adjusted under 35 U.S.C. 154(b) by 1202 days.

(21) Appl. No.: 11/916,682

(22) PCT Filed: Jun. 6, 2006

(86) PCT No.: PCT/IB2006/051792
§ 371 (c)(1),
(2), (4) Date: Dec. 6, 2007

(87) PCT Pub. No.: WO2006/131879
PCT Pub. Date: Dec. 14, 2006

(65) Prior Publication Data
US 2010/0220735 A1 Sep. 2, 2010

(30) Foreign Application Priority Data
Jun. 9, 2005 (EP) .................................... 05105064

(51) Int. Cl.
*H04L 12/28* (2006.01)
(52) U.S. Cl.
USPC .......................................... 370/401; 710/316
(58) Field of Classification Search
USPC ......... 370/401, 458, 244; 710/36, 263; 701/1, 701/76; 711/154; 709/224
See application file for complete search history.

(56) References Cited

U.S. PATENT DOCUMENTS

| | | | |
|---|---|---|---|
| 6,215,773 B1* | 4/2001 | Karlsson | 370/244 |
| 2003/0065856 A1* | 4/2003 | Kagan et al. | 710/263 |
| 2003/0196207 A1 | 10/2003 | Horton et al. | |
| 2003/0225983 A1* | 12/2003 | Habben et al. | 711/154 |
| 2004/0030482 A1* | 2/2004 | Fuehrer et al. | 701/76 |
| 2004/0081193 A1* | 4/2004 | Forest et al. | 370/458 |
| 2005/0132105 A1* | 6/2005 | Hall et al. | 710/36 |
| 2005/0198280 A1* | 9/2005 | Hall et al. | 709/224 |
| 2006/0259204 A1* | 11/2006 | Jordan et al. | 701/1 |

FOREIGN PATENT DOCUMENTS

| | | |
|---|---|---|
| CN | 1039516 A | 2/1990 |
| CN | 1346557 A | 4/2002 |
| CN | 1126315 C | 10/2003 |
| EP | 1085719 A2 | 3/2001 |
| EP | 1355456 A1 | 10/2003 |
| WO | 2004105328 A1 | 12/2004 |
| WO | 2005002145 A1 | 1/2005 |

* cited by examiner

*Primary Examiner* — Dang T Ton
*Assistant Examiner* — Lionel Preval

(57) ABSTRACT

The present invention relates to a data storage unit for a communication system node, a method for data storage and a communication system node. More particularly it relates to storing buffering data and control data in a unit located outside of a Communication Controller on system or host-controller level, wherein a time-triggered protocol runs on the node. By locating control and buffering related data, including format and behavior, outside the Communication Controller it becomes far more flexible, extendable, and re-configurable as data buffering related restrictions, e.g. buffer sizes and number of buffers, are moved from Communication Controller level to system level.

19 Claims, 7 Drawing Sheets

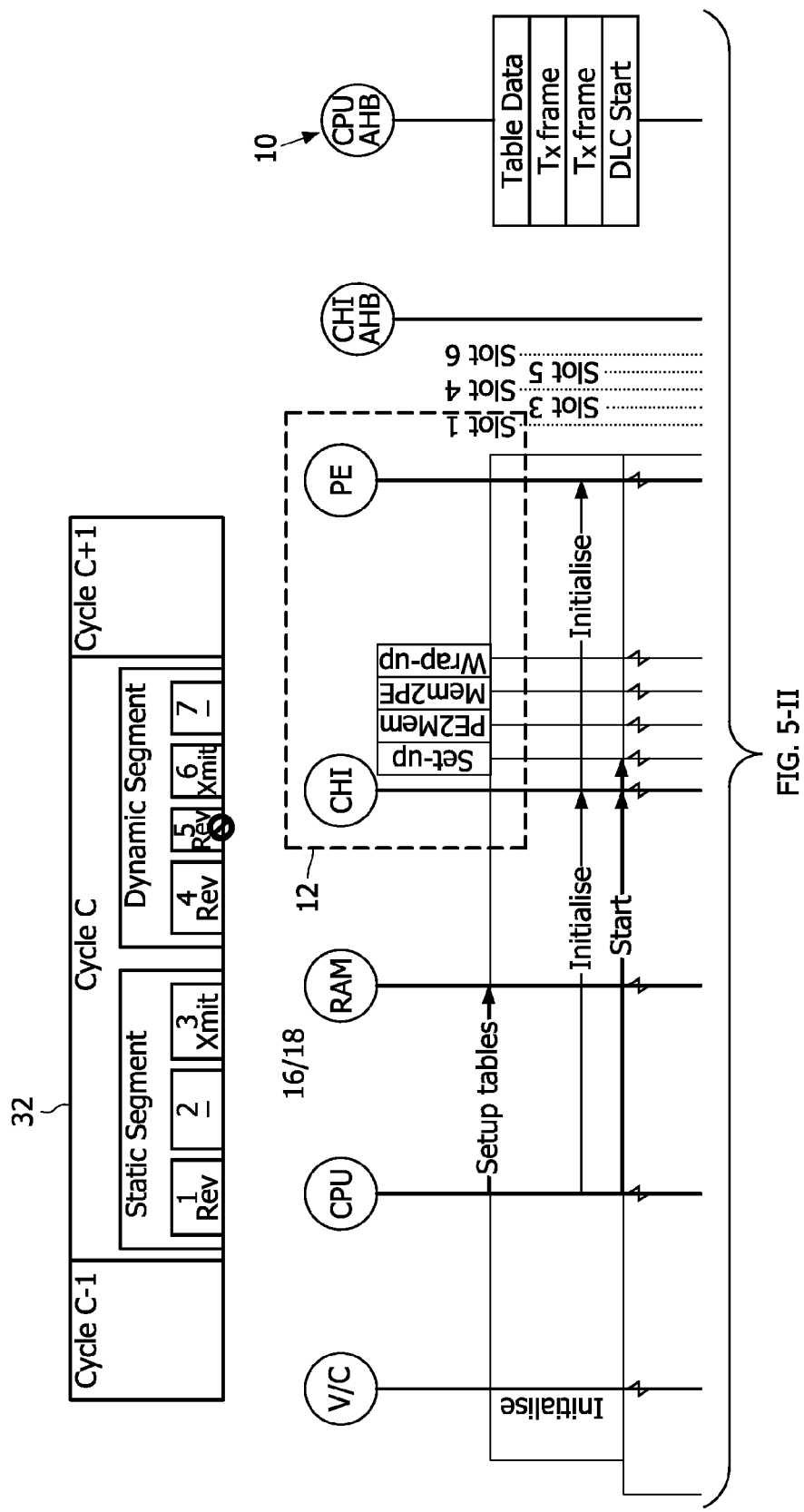
FIG. 5-I

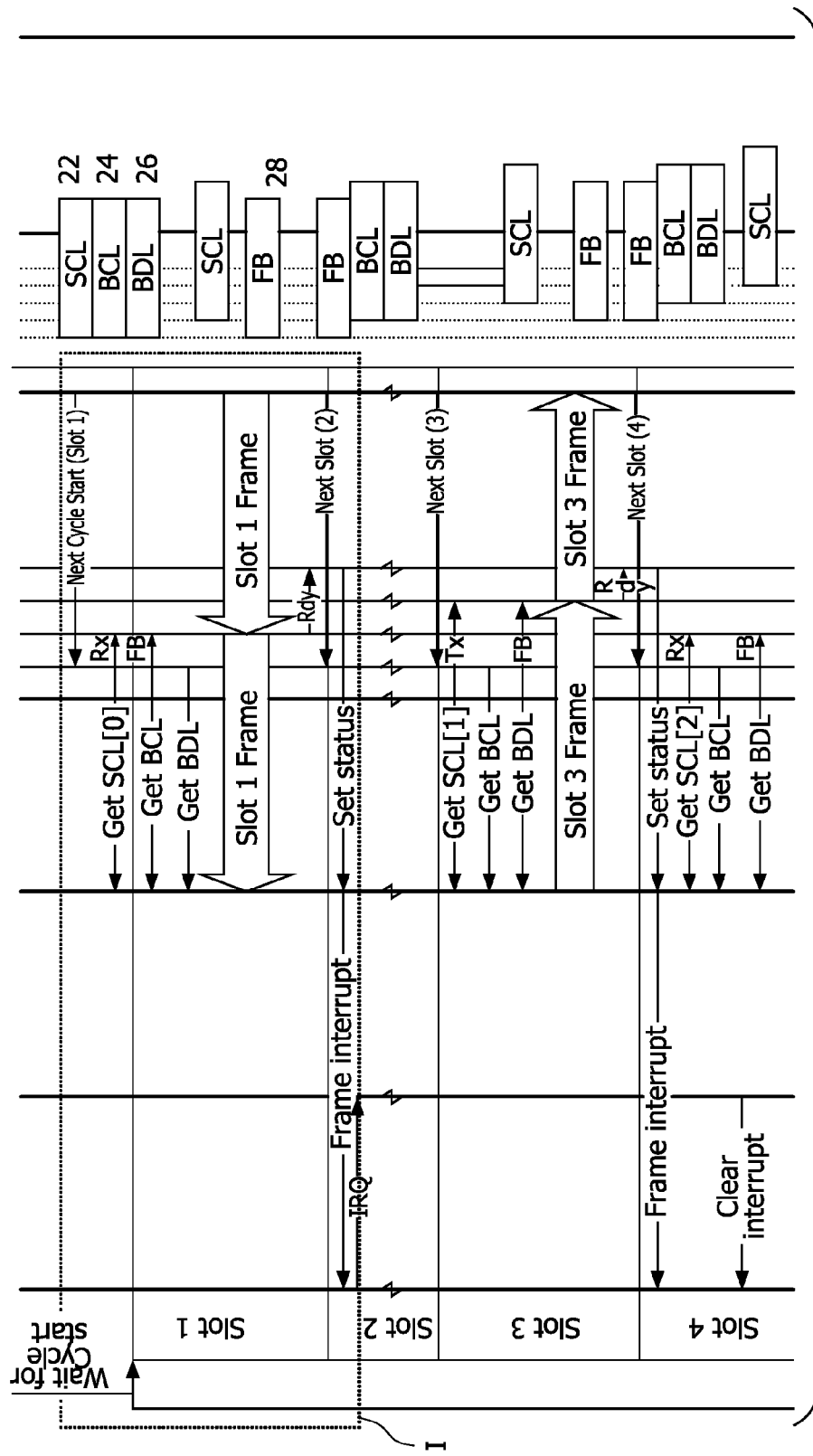
FIG. 5-II

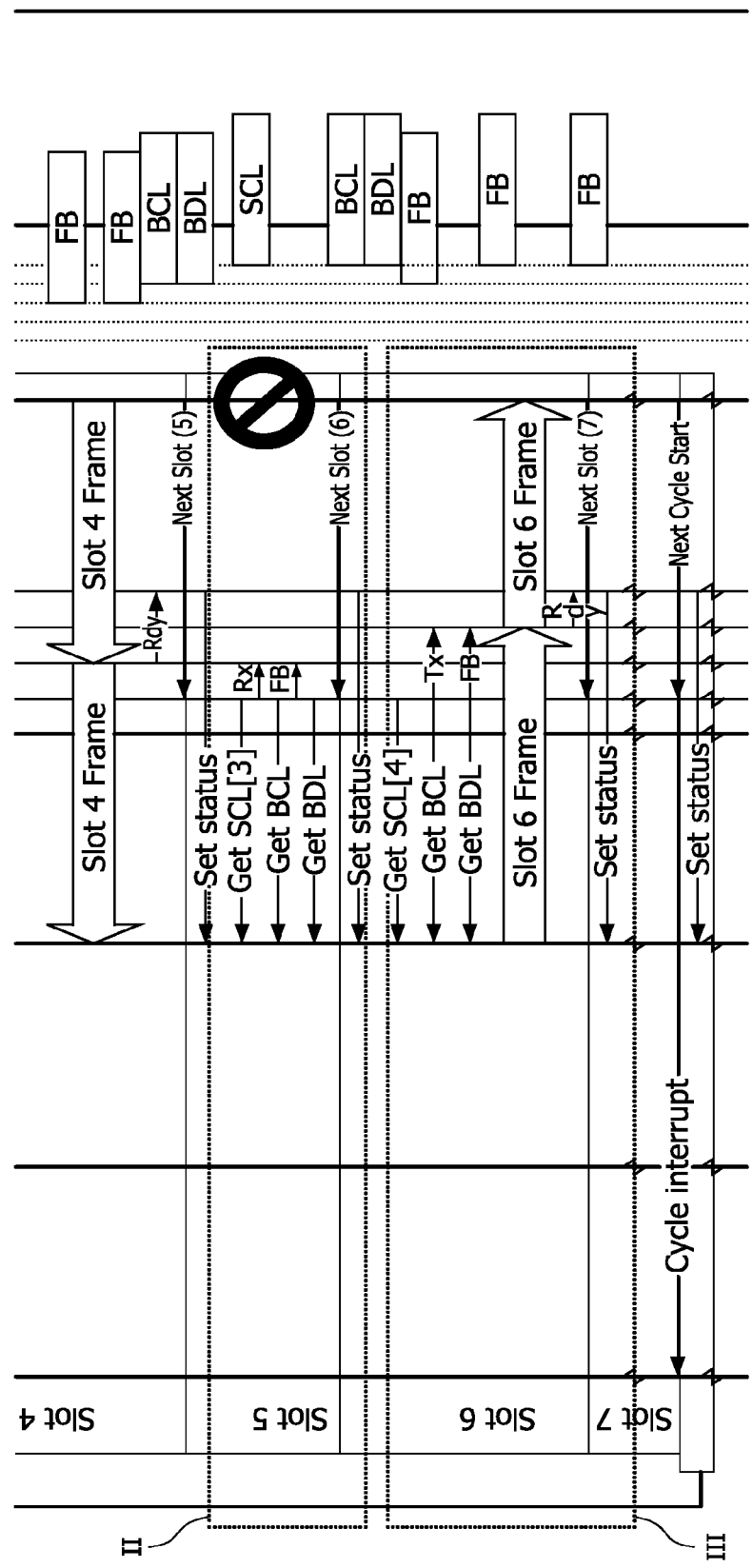
FIG. 5-III

STORAGE UNIT FOR COMMUNICATION SYSTEM NODE, METHOD FOR DATA STORAGE AND COMMUNICATION SYSTEM NODE

FIELD

The present invention relates to a data storage unit for a communication system node, a method for data storage and a communication system node. More particularly it relates to storing buffering data and control data in a unit located outside of a Communication Controller on system or host-controller level, wherein a time-triggered protocol runs on the node.

BACKGROUND

In recent years the automotive industry witnessed a significant increase in the amount of electronic systems being introduced into their products. Different communication systems have been developed for the operation of the various Electronic Control Units (ECUs). A communication system in general comprises a number of units or nodes, which communicate with each other. The communication is usually done via a bus, which logically connects several nodes over the same set of wires. Each node consists of a host-controller, a Communication Controller and a physical device generating data. The Communication Controller transmits data received by the Host Controller and supplies received data to the Host Controller.

Different bus systems are known in the art. The LIN-Bus (Local Interconnect Network) is a bus-system used within current automotive network architectures. It is designed for mechatronic applications in cars and is a small and rather slow network system. The integrated members are intelligent sensor devices or actuators. One dedicated node is set up as a LIN Master, all other attached nodes are the LIN Slaves. This topology is fixed and cannot be changed afterwards.

A faster network is the Controller Area Network (CAN), a multicast shared serial bus standard originally developed in the 1980s for connecting electronic control units. CAN was specifically designed to be robust in noisy environments and is a network for enabling any device to communicate and work with any other device or network without creating a great strain on the bus. In automotive applications it is used, e.g., for air condition control units, seat actuators, centralized door locking systems or acceleration skid control. In addition to CAN networks, many vehicles use additional LIN buses for smaller subnetworks.

However, the introduction of advanced control systems combining multiple sensors, actuators and electronic control units are beginning to place demands on the communication technology that are not currently addressed by existing communication protocols. For a wire replacement of mechanical and hydraulic braking and steering systems imposing stringent requirements in reliability and survivability distributed fault tolerant computer systems are mandatory. Moreover, safety-relevant applications require real-time data management. A high priority message must be transmitted in a predefined amount of time in all situations. Flexibility in both bandwidth and system extension are also key attributes as the need for increased functionality and on-board diagnostics also increase. Advanced control systems have begun to place boundary demands on the existing CAN communications bus.

The FlexRay system has been proposed to fulfil the demand for a bus system with a deterministic and error-tolerant communication and a high data rate of up to 10 Mbit/s. It is highly flexible regarding changes of a network configuration. In contrast to current event-triggered communication protocols such as CAN, FlexRay combines a time-triggered along with an event-triggered system. At the core of the FlexRay system is the FlexRay communications protocol. The protocol provides flexibility and determinism by combining a scalable static and dynamic message transmission, incorporating the advantages of familiar synchronous and asynchronous protocols. The protocol supports fault-tolerant clock synchronization via a global time base, collision-free bus access, message oriented addressing via identifiers, scalable system fault-tolerance via the support of either single or dual channels.

The FlexRay controller comprises a transmitter and receiver unit for each of its channels, where each transmitter and receiver unit can also be separated into two independent units, a timing unit, a controller host interface (CHI) for connection to the host and a protocol state machine. Extracted data or data for transmission are stored in buffers. The FlexRay architecture levels comprise a host level, a controller host interface level, a protocol engine level, a channel interface level and a topology level with possible channels A and B. Data transmitted through the controller host interface includes status data, control data, e.g. external clock synchronization, message data or configuration data related to the network or node configuration.

EP 1355456 discloses the FlexRay protocol. A network system with a least one node coupled to a communication line and with means for communication, which are able to create a communication cycle on said communication is provided.

The communication cycle is the fundamental element of the media access scheme within FlexRay. It is defined by means of a timing hierarchy. The timing hierarchy consists of four timing hierarchy levels as depicted in FIG. 1. The highest level, the communication cycle level, defines the communication cycle. It contains the static segment, the dynamic segment, the symbol window and the network idle time (NIT). The next lower level, the arbitration grid level, contains the arbitration grid that form the backbone of FlexRay media arbitration. In the static segment the arbitration grid consists of consecutive time intervals, called static slots, in the dynamic segment the arbitration grid consists of consecutive time intervals, called minislots.

WO 2005/002145 discloses an assembly and method for managing a memory that is accessed by a Communication Controller and a host processor of a network node in a network. The assembly and method are preferably applied to a FlexRay bus system. An identifier is assigned to each data message, and a number of buffers that corresponds to the number of relevant identifiers are provided in the memory of a network node. Control data is stored in at least some of the buffers that have been assigned to the identifiers.

WO 2004/105328 describes a message memory for a communication protocol and method, applicable to CAN or FlexRay systems. Using a combination of a virtual memory representation and a physical memory divided into a specific number of segments as a message memory, the memory allows optimisation for specific use in an application in terms of the quantity of message objects and their data capacity.

Modern communication systems like FlexRay are specifically designed for fault-tolerance and flexibility. A disadvantage of the existing solutions is that configuration data and buffer data are handled through dedicated logic inside the Communication Controller such that any access to this data has to be handled though a Communication Controller access slave port. Such dedicated logic inside the controller puts a constraint on the configuration space of the network and defines a maximum number of buffers thus providing an upper limit to the flexibility of the communication system.

BRIEF SUMMARY

It is an object of the present invention to provide a data storage unit for a communication system node, a method for data storage and a communication system node increasing the flexibility of a communication system based on a time-triggered protocol.

It is a further object of the present invention to provide a data storage unit for a communication system node, a method for data storage and a communication system node to decrease the production costs of a communication system based on a time-triggered protocol.

According to an aspect of the present invention for achieving the above objects a communication system node is provided, comprising a Host Controller, at least one general memory unit on host-controller level, and a Communication Controller, wherein the communication is based on a time-triggered protocol, that at least one storage unit for configuration and buffering related data is provided outside the communication controller on host controller level and that the communication controller is not provided with a storage unit for configuration and buffering related data.

By locating FlexRay data buffering related data, including format, behaviour, and cycle/slot coupling, outside the Communication Controller (CC) it becomes far more flexible, extendable, and re-configurable as data buffering related restrictions, e.g. buffer sizes and number of buffers, are moved from intra-CC level to extra-CC system level.

The storage unit comprises the following linked data structures:
  a slot control list to associate communication controller time slots to their respective buffers, linked to
  a buffer control list to associate a buffer to its buffer entries, linked to
  a buffer descriptor list to associate a buffer-entry to its frame or message data, linked to
  a frame buffer to hold frame or message and status data.

The slot control list provides definition of relevance and purpose of communication controller slots to a communication system node, and holds the logical link to its buffer.

The buffer control list provides definition of behaviour, holds the status of a buffer, and holds the logical link to the buffer-entries of the buffer.

The buffer descriptor list provides definition of characteristics of a buffer entry, and holds a logical link to the frame buffer.

The frame buffer provides a storage area that holds frame or message and status data.

Said Slot Control List and said Buffer Control List are linked via calculation units, which add an appropriate offset to a baseaddress. Said Buffer Control List and said Buffer Descriptor List are linked via a second 'add appropriate offset to a baseaddress' address calculation unit. Said Buffer Descriptor List and said Frame Buffer are linked via a regular address.

In a preferred embodiment the storage unit is a general-purpose logic located inside said general memory unit on system or host controller level, and outside the Communication Controller.

The Communication Controller incorporates a dedicated logic for data retrieval, interpretation, execution, and status update and is provided with a slot control list addressing unit linked to the slot control list to address entries in the Slot Control List, a buffer control list addressing unit to address entries in the Buffer Control List, wherein the buffer control list addressing unit is linked to said address calculation unit between the Slot Control List and the Buffer Control List, and a buffer descriptor list addressing unit to address entries in said Buffer Descriptor List, wherein the Buffer Descriptor List addressing unit is linked to said address calculation between the Buffer Control List and the Buffer Descriptor List.

In a preferred embodiment the Communication Controller is realized as a FlexRay Data Link Controller and said time-triggered protocol is the FlexRay protocol.

Accordingly, a storage unit within a communication system is provided, wherein the system is provided zero or more active time slots and at least one logical buffer due for transmission (Tx) or receipt (Rx), comprising a set of linked data structures:
  a Slot Control List to associate Communication Controller time slots to their respective buffers, linked to
  a Buffer Control List to associate buffer entries to a buffer, linked to
  a Buffer Descriptor List to associate a buffer-entry to its frame or message data, linked to
  a Frame Buffer to hold frame or message and status data.

A buffer is to hold data and basically can have 3 states: empty, full, and in-between. An empty buffer can be such e.g. because it has proper BCL and BDL data, but is not linked to a Frame Buffer. This is a valid configuration and possible due to the flexibility of the present invention.

Accordingly a method for data storage within a communication system for time-triggered communication protocols, comprising the steps:
  addressing an entry of a slot control list through a Communication Controller;
  linking a Slot Control List entry to a buffer control list entry to associate a time slot to a buffer, and addressing this entry of a Buffer Control List through said Communication Controller;
  linking a buffer control list entry to a buffer descriptor list entry to associate a buffer to a buffer entry, and addressing this entry of a Buffer Descriptor List through said Communication Controller;
  linking an entry of said Buffer Descriptor List to a frame buffer, and addressing this frame buffer through the said Communication Controller;

Note that each of these steps is conditional, i.e. an SCL entry is not read unless it was due for read, i.e. identified as such by the previous SCL entry. If an SCL entry does not require action then no BCL is read, etc. This also adds to the flexibility of the present invention as one can deliberately avoid elements from being read and such influencing the Communication Controller's behaviour.

It is an advantage of the present invention that buffering outside the Data Link Controller/Communication Controller moves the issue of defining its configuration space, e.g. supported behaviour, maximum number of buffers, from DLC/CC to system level. In this way restrictions result from the amount of memory that is available at system level, instead of the amount of memory inside the DLC/CC itself.

Replacing a dedicated logic inside a DLC/CC implementation by data in general purpose memory at system level reduces the costs of the system. It is more flexible, re-configurable and more extendible.

The foregoing and other objects, features, and advantages of the invention will be apparent from the following more particular description of preferred embodiments of the invention, as illustrated in the accompanying drawings.

BRIEF DESCRIPTION

The present invention will now be described by way of example with reference to the accompanying drawings, in which:

FIG. 1 FlexRay communication cycle in a schematic view.

FIG. 5 shows a typical data flow in a FlexRay environment using a storage unit according to the invention.

DETAILED DESCRIPTION

Figure 1:
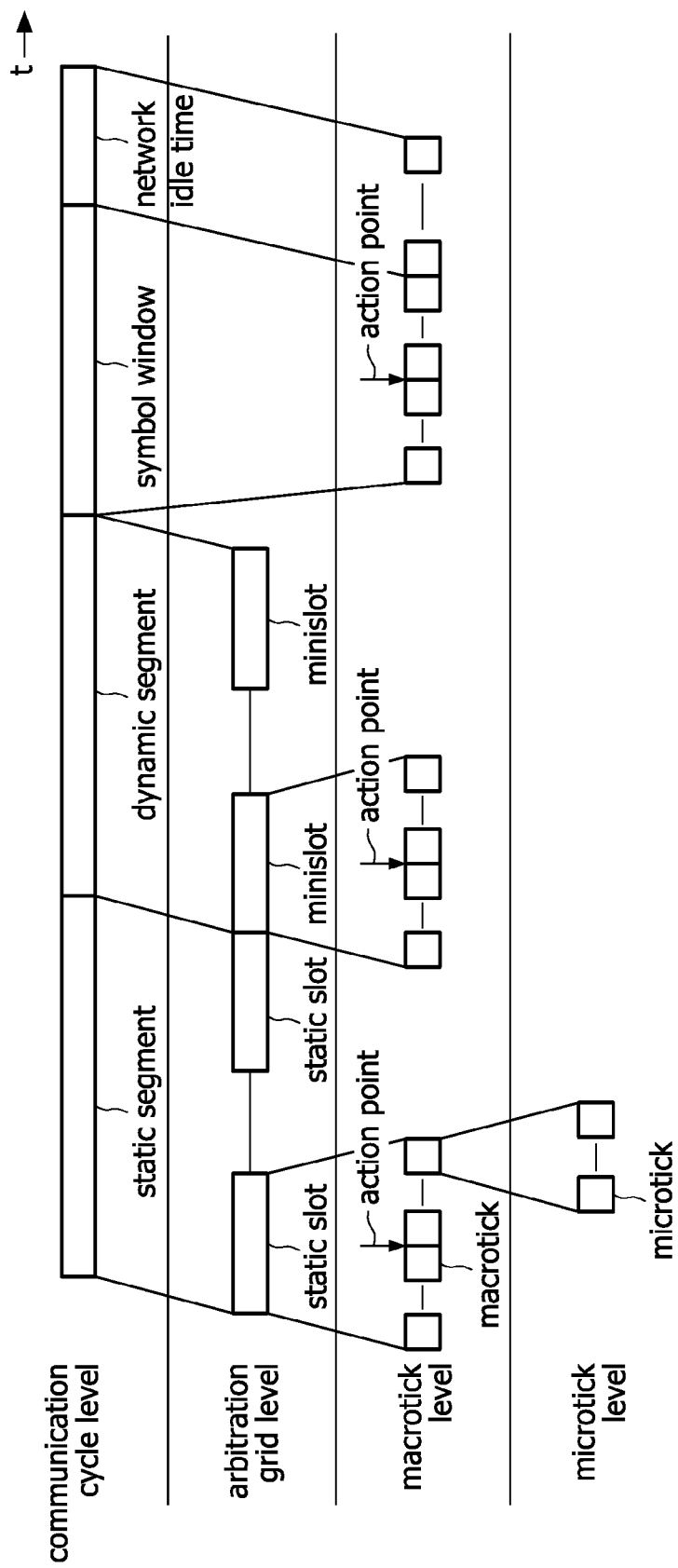

A communication system in general comprises a number of nodes, which exchange messages. Each of these nodes comprises a Host Controller, a Communication Controller and a physical unit generating data. The Host executes application software, evaluates received data and generates data to be sent to the Communication Controller. The Communication Controller is connected to one or two channels of the so-called physical layer where it can send and receive messages, and is provided with a controller host interface (CHI) for communication with the Host.

The present invention relates to time-triggered network protocols such as FlexRay, in which any network activity is launched in predefined time slots. The system adjusts the local time of an electrical control unit with the help of special control algorithms. This ensures that all local clocks of the individual nodes in a cluster are running synchronous to a global clock. To permit deterministic behaviour FlexRay's transmission scheme is organized into cycles. Each communication cycle is subdivided into a static segment and a dynamic segment of configurable length. Within the static segment specific time windows or slots are allocated to each network node. Messages of a node are transmitted at the fixed time points of the respective slots. The defined send times of the assigned slots guarantee a deterministic transmission of data. The length of each of the static and dynamic segments is defined during the network configuration. A frame consists of a given set of data packed in a prescribed way transmitted in one slot on one channel. Note that FlexRay explicitly defines how to handle the Tx of multiple frames in a slot, which is not an error by default. A message comprises all application data transported within a frame. Several messages may be packed together to constitute a frame.

In the preferred FlexRay embodiment of the invention each frame divides into three segments: Header, Payload, and Trailer. A Header includes, e.g. Frame ID, which identifies a frame. The Payload has the data transferred by the frame. The Trailer is used to detect errors.

Different types of data are communicated between the controller and the Host, like status data, control data, message data or configuration data.

Status data are stored within Frame Buffer and Buffer Control List, both present in memory. Control data are stored in SCL, BCL, BDL and Frame Buffer (all in memory), which are accessible by the CC through a limited set of control data (baseaddress and list lengths) inside the CC. Message data are stored in Frame Buffers or for Tx generated as a result of a data structure setup that does not result in access to a Frame Buffer holding data. Configuration data are what is required to access SCL, BCL, and BDL (baseaddresses and list lengths) is stored inside the CC, the rest is stored inside the data structures. So the memory area hosts most data including the message area, i.e. SCL, BCL, BDL, and FB.

The message area contains a memory area where the frames to be sent/received are stored together with status information for each frame. Access to of the data in this memory area is determined in the configuration data of each Communication Controller. The layout of the data in this memory is defined in terms of SCL, BCL, BDL, and FB, but not necessarily all of these, e.g. only having an SCL is a valid configuration and does result in FlexRay compliant CC behaviour.

FIG. 1 shows a schematic view of a FlexRay communication cycle. The communication cycle is the fundamental element of the media access scheme within FlexRay. It is defined by means of a timing hierarchy consisting of four timing hierarchy levels. The highest level, the communication cycle level, defines the communication cycle. It contains the static segment, the dynamic segment, the symbol window and the network idle time (NIT). Within the static segment a static time division multiple access scheme is used to arbitrate transmissions. Within the dynamic segment a dynamic mini-slotting based scheme is used to arbitrate transmissions. The next lower level, the arbitration grid level, contains the arbitration grid that form the backbone of FlexRay media arbitration. In the static segment the arbitration grid consists of consecutive time intervals, called static slots, in the dynamic segment the arbitration grid consists of consecutive time intervals, called minislots.

Figure 2:
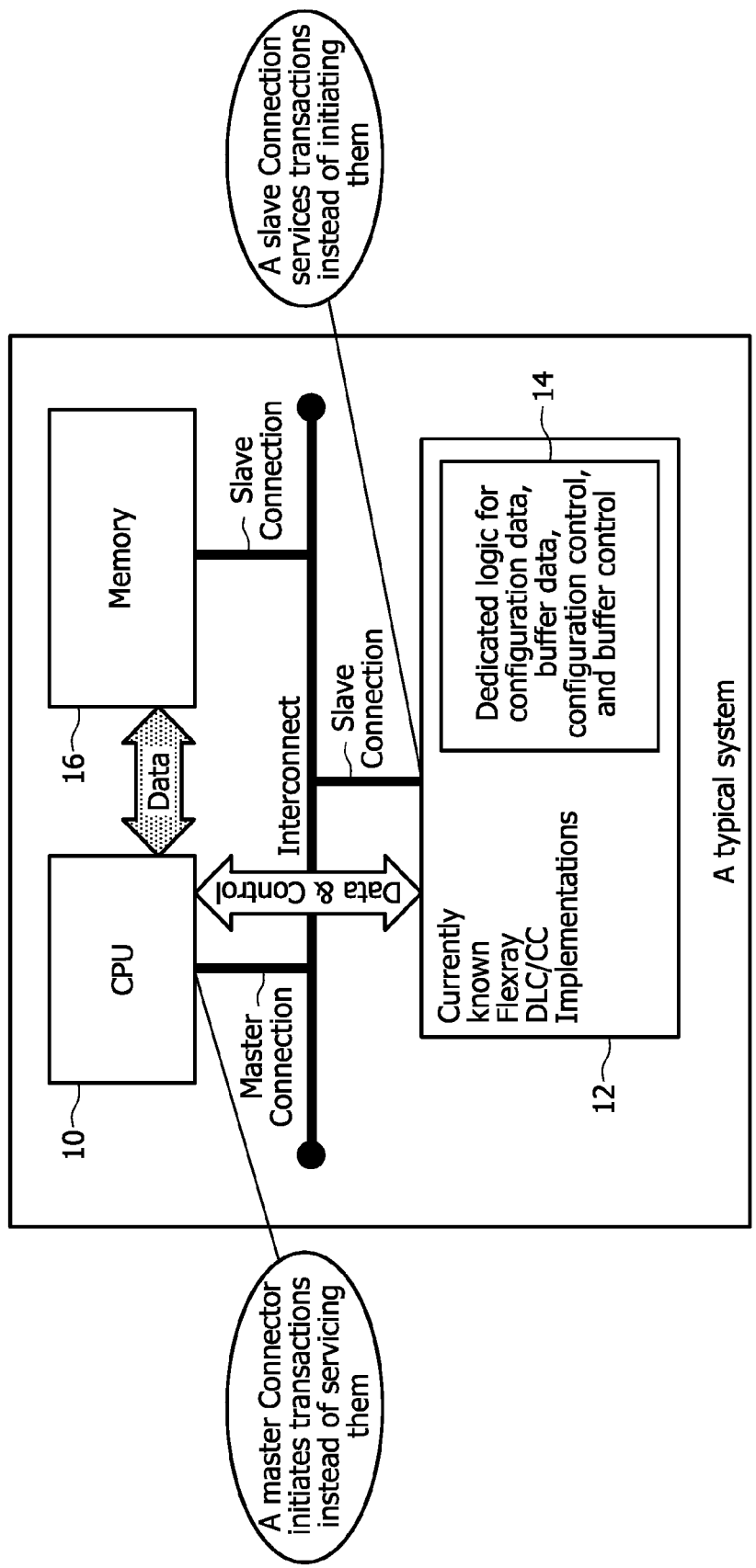
FIG. 2 shows a communication system node of the state of the art in schematic view.

FIG. 2 shows a communication bus system node of the state of the art. The system comprises a Host Controller 10, a Communication Controller 12, here a FlexRay controller, a general memory unit 16 on host controller level and an interconnect line to connect the parts.

It is to be noted that any Host Controller requires a memory unit to (temporary) hold the data it has read from or wants to write to a CC. This memory is not there as a result of the presence of the CC, it is there to make the Host Controller work.

The Host Controller 10 is implemented as a master and controls the Communication Controller 12, exchanges transmit and receive data and control to/from the Communication Controller 12 and exchanges transmit and receive data to/from the memory unit 16.

The Communication Controller 12 is provided with a dedicated logic 14 for configuration data, buffer data, configuration control and buffer control. The Communication Controller 12 therefore holds all control and buffering related data, including format and behaviour, in itself such that any access to this data has to be handled through a DLC/CC access port, e.g. an AMBA2 AHB slave port.

Figure 3:
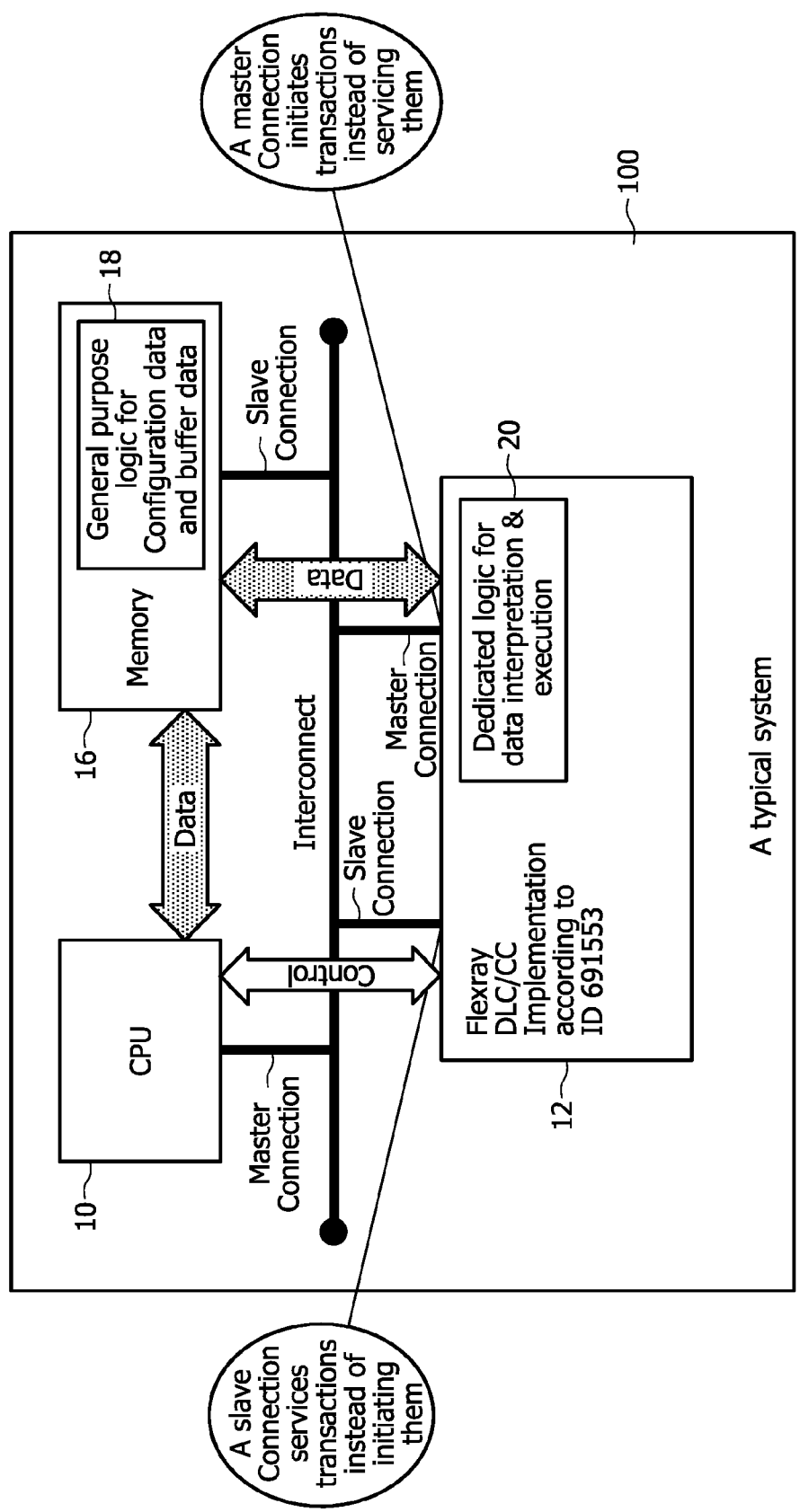
FIG. 3 shows a communication system node according to the invention in a schematic view.

FIG. 3 shows a communication system node according to the present invention. In this preferred embodiment the configuration data and buffer data are now being stored in a general-purpose logic 18 inside the main memory 16, i.e. they are stored on system level.

Since this memory is already there to make the Host Controller work the present invention allows it to be (re-)used for CC data. This saves both chip area and CPU execution cycles. Cycles are saved since in general memory access is far more efficient than access through a slave port.

The Communication Controller 12, here again a FlexRay controller, provides a dedicated logic 14 for data access, interpretation, execution, and update. The Data Link Controller (DLC) or Communication Controller 12 (CC) retrieves, interprets, executes, and updates data structures in the general memory 16/18 through its own master port(s). The data structures have initially been put in memory 16 by the host 10, the CPU. Communication Controller related status data in the data structures is put in memory 16 by the Communication Controller 12 through data structure updates.

To inform the Host Controller about data structure execution and update the Communication Controller may support interrupts (events) towards the Host Controller. Typically these events are generated from status data held inside the CC that reflects the status updates of the data structures in memory.

By locating data buffering related data, including format and behaviour, outside the FlexRay Data Link Controller 12, e.g. in on-chip or off-chip memories, it becomes far more flexible, extendable, and re-configurable as data buffering related restrictions, e.g. supported behaviour, buffer sizes and number of buffers 28, are moved from DLC/CC level to system level. Also Host Controller access to this data is more efficient as access to data in general memory is typically far more efficient (less clock cycles) than access to data in a CC through a dedicated slave port.

In this way restrictions result from the amount of memory that is available at system level, instead of the amount of memory inside the DLC/CC 12 itself. This allows for effective and efficient software/hardware partitioning. Also access restrictions result from the access provided by the memory that is available at system level instead of the access provided by the DLC/CC itself. This also allows for effective and efficient software/hardware partitioning.

This concept uses data in memory 16/18 to define data structures that also specify the required data buffering behaviour, instead of using dedicated logic 14 for this purpose. As a result more flavours of data buffering behaviour can be supported than the ones currently required by the FlexRay Protocol specification version 2.0. An example in the context of Flexray is queued buffering for transmit, multiple transmit or receive slots sharing a single buffer, and the capability of buffer access and update without the need for a lock/unlock mechanism.

Since dedicated logic 14 inside the DLC/CC 12 is replaced by general purpose logic 18 outside the DLC/CC, i.e. on system level, the silicon cost of a DLC/CC 12 implementation can be reduced as general purpose logic 18 at system level is cheaper than dedicated logic 14 inside the DLC/CC 12.

The essential advantages of this invention are the following:

Lower costs through replacing a dedicated logic 14 inside a DLC/CC implementation by data in general purpose memory 18 at system level. This general-purpose logic 18 can be shared with other functions when not used by the DLC/CC 12.

More flexible: the configuration space of data buffering will now be restricted to the amount of memory 16 available at system level instead the amount of logic 14 inside the DLC/CC 12.

More extendible since data-buffering behaviour is defined by data in memory 16 it will allow for additional flavours without the need to modify the DLC/CC 12 itself.

Increased re-configuration ability: the data buffering behaviour of the DLC/CC 12 can easily be adjusted through software now that this behaviour is seized through data in memory instead of dedicated logic 14.

Preferably the storage unit is put into the general memory on system level. However, it could also comprise one or more separate memories on system or host controller level.

Figure 4:
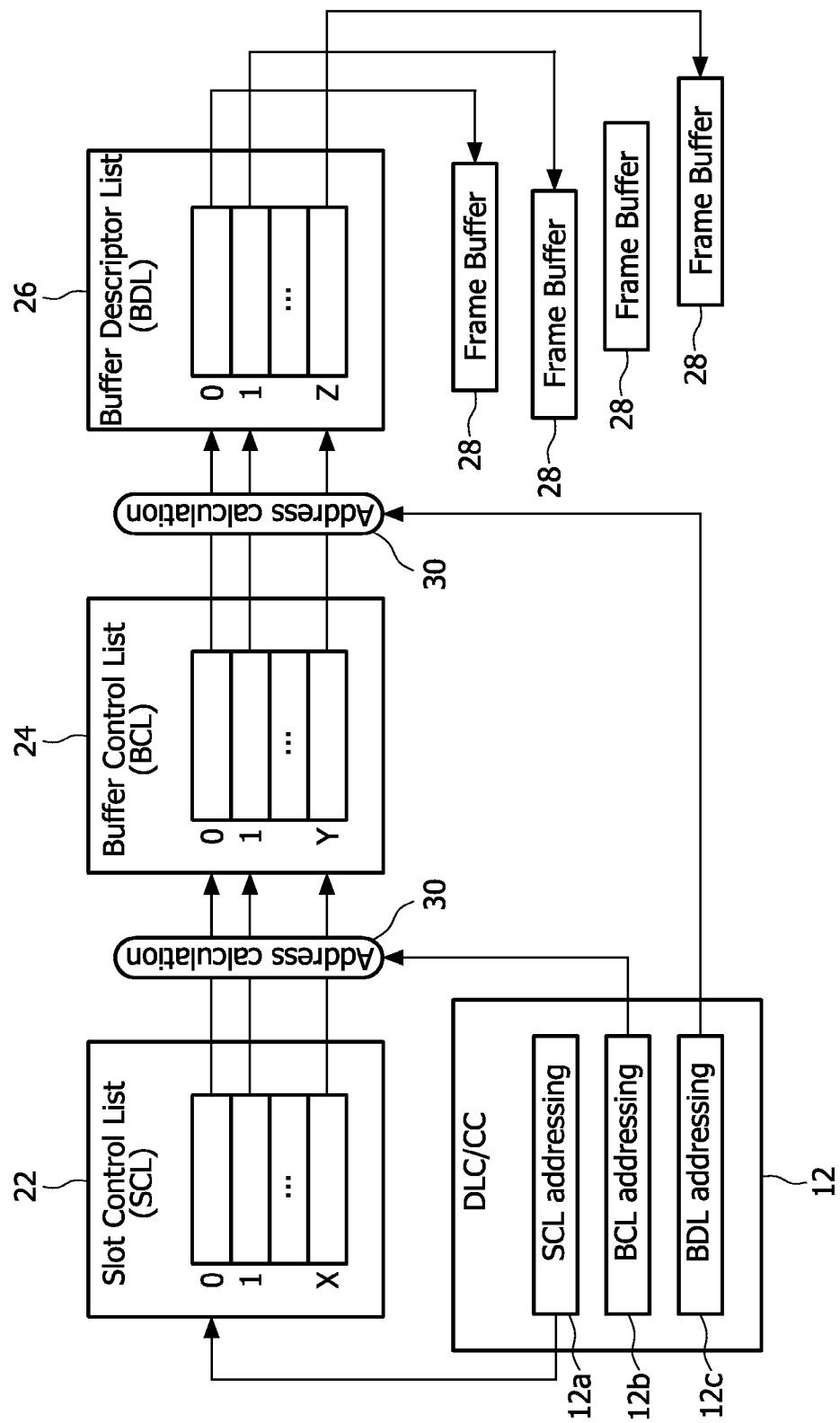
FIG. 4 shows a communication controller together with a data storage unit according to the invention in a schematic view.

FIG. 4 shows a detailed view of the Communication Controller 12 and the logic 16 for buffering on system level. A data storage approach according to the invention is defined by a set of linked data structures in memory:

data structures in memory that control DLC/CC 12 transmit and receive behaviour;

data structures in memory that hold actual transmit and receive data;

data structures in memory that hold transmit and receive status information;

explicit separation of system read access from DLC/CC 12 write access, and vice versa.

The storage unit 18 uses the following data structures:

SCL Slot Control List 22: to define the behaviour of FlexRay slots and to link a FlexRay slot to its buffer 28;

BCL Buffer Control List 24: to define the behaviour of a buffer and to link a buffer to its buffer-entries;

BDL Buffer Descriptor List 26 to define the behaviour of a buffer-entry and to link a buffer-entry to its data area (a.o. a FlexRay frame);

FB Frame Buffer 28: to define the behaviour of and to hold frame (message) and status data.

More precisely the data structures are a slot control list 22 to characterise communication controller time slots and to associate communication controller time slots to their respective buffers 28, linked to a buffer control list 24 to characterise a buffer 28 and to associate this buffer 28 to its buffer entries, linked to a buffer descriptor list 26 to characterise a buffer-entry and associate this buffer-entry to its frame or message data, linked to a frame buffer 28 to characterise and hold frame or message and status data.

The purpose of these data structures and their relation is as follows:

The SCL 22 is a continuous list of entries, one for each slot or range of slots that is of interest for a node. A slot will be of interest to a node if the node wants to use that slot to receive or transmit data (Rx, Tx). The SCL 22 defines the relevance and purpose of FlexRay slots to a FlexRay node. It links to the BCL 24 to associate buffers with slots.

Note that for a 2 channel DLC/CC there are 2 SCLs, one for each channel. There is only one BCL, BDL, and set of FBs that will be shared by both channels. This '2 of a kind' and '1 of a kind' is conceptual as its physical implementation can be different, e.g. a single physical memory holding both conceptual SCLs as a single contiguous block of data, and two adjacent and hence contiguous physical memories holding a single BCL. This present invention is therefore build upon logical data structures whose physical representation is free as long as it reflects its logical counterpart.

The BCL 24 is also a continuous list of entries, one for each buffer 28 that is referred to by the SCL 22. A buffer is an abstract for the combination of BCL 24, BDL 26, and FB 28; BCL 24 provides the buffer definition, BDL 26 provides the entry definition, FB 28 provides the buffer data; a single item in BCL 24 is linked to 1 or more items in BDL 26.

In general a buffer is structure capable of managing data through one or more entries in a defined way. Note that even though a buffer has multiple BDL entries it can still be considered empty, i.e. as not having entries, as the presence of a BDL entry does not imply the buffer has an entry. A buffer has an entry if it has a BDL entry and an associated FB that are both accessible and whose contents is correct. Explicit manipulation of access and content is part of the flexibility offered by the present invention.

The BCL 24 defines the behaviour and holds the status of a buffer, e.g. the number of entries, next entry to read and write, and links to the BDL 26 to associate buffer entries to a buffer 28.

Note that the BCL is a list with 1 entry per buffer. If a number of 4 buffers exists then the BCL has 4 entries. If a 5$^{th}$ buffer is to be set-up this can be done by adding a 5$^{th}$ entry at the end of the 4-entry list.

The BDL 26 provides a list of entries, one for each entry that is part of a buffer 28 in the BCL 24. A buffer entry provides access to the actual location of frame related data. This area is referred to as "frame buffer 28". A single entry in the BDL 26 defines the characteristics of a buffer entry, e.g. its data size, and links to a FB 28 to associate a buffer-entry to its frame data.

Note that the BDL is a list with 1 or more entries per buffer. If 4 buffers exist each with 3 entries then the BDL has 4 times 3 is 12 entries.

The FB 28 is an area of memory that holds frame (message) related data.

Since it is referred to in the BDL 26 through an address, it can be anywhere in the address range of the system (4 GB for 32-bit addressing). A FB 28 will not only hold payload data for Rx/Tx, but also status data.

An SCL 22 is accessed by adding the offset associated with its relative position in the list to the SCL baseaddress 12a The SCL 22 is linked to the BCL 24 via an 'add BCL-offset in SCL-entry to BCL baseaddress 12b' address calculation unit 30. The BCL 24 itself is also linked to the BDL 26 via a second 'add offset in BCL to BDL baseaddress 12c' address calculation unit 30. Each BDL entry is linked to a frame buffer 28.

The Communication Controller 12 holds the address of the first SCL entry in unit 12a, the address of the first BCL entry in unit 12b, and the address of the first BDL entry in unit 12c. They are linked to the Slot Control List 22, the first address calculation unit 30 between the SCL 22 and the BCL 24, and the second address calculation unit 30 between the BCL 24 and the BDL 26.

The data flow is as follows: The Data Link Controller 12 addresses the Slot Control List 22 through the SCL addressing unit 12a. The Slot Control List 22 connects the respective time slot with the Buffer Control List 24 addressed by the DLC/CC 12. The BCL 24 defines the behaviour and holds the status of a buffer, e.g. the number of entries, and links to the BDL 26 to associate buffer entries to a buffer. The BDL 26 is addressed by the DLC/CC 12. The BDL 26 defines the characteristics of a buffer entry, e.g. its data size, and links to a FB 28 to associate a buffer-entry to its frame data.

In general, the term 'address calculation' translates into creating an address by adding an offset to a baseaddress. For the SCL this is done through an SCL entry counter that is incremented for each slot in which the DLC/CC needs to do a Tx/Rx, whereas this counter acts as the offset to add to the SCL baseaddress to get the address of the actual SCL entry to process. For the BCL the offset is in an SCL entry, for the BDL the offset is in a BCL entry.

FIG. 5 shows a sample data flow in a FlexRay environment using a storage unit 18 according to the invention. The communication cycle 32 depicted in the top of FIG. 4 uses seven slots, wherein the static segment consists of three slots and the dynamic segment consists of four slots in this particular cycle. The DLC/CC 12 is to receive in slot 1, to transmit in slot 3. Slot 2 is unused. The dynamic slot is used for four slots. The DLC/CC 12 is to receive in slot 4 and 5, transmit in slot 6, and slot 7 is not used by this node 100. There is no data received in slot 5.

The scenario covers the initialisation of the data structures in memory, the set-up of the controller host interface (CHI), the execution of what is defined by the data structures together with the Protocol Engine PE.

Furthermore it covers data traffic on the AHB bus used by the CHI and that used by the CPU, the Host 10. The CHI is represented by four conceptual threads to illustrate that the data structures support parallelism and concurrent processing. The threads are:
  Set-up: setting up for the next Tx, Rx, or idle slot (SCL 22; BCL 24);
  PE2Mem: receive from the PE and store the Rx data in memory.
  Mem2PE: read data from memory and transmit it towards PE;
  Wrap-up: finish a Tx or Rx by updating the status in the memory (FB 28).

FlexRay's 'cycle start' event (for example) is used to trigger the read of the SCL, then read of BCL, then read of BDL, then access to FB as depicted in the part of the figure labelled "I". Then receive of frame in slot 1. After receive the data-structure in memory is updated with a status ('Set Status') after FlexRay's 'next slot' event (for example). 'Rx' means SCL requests receive. 'Set Status' means store frame and buffer status data in data structure (FB and BCL). FB means frame buffer details are exchanged to allow frame to be written to frame buffer.

Part II of the figure is an example of expecting a receive but no frame is received (FlexRay's dynamic segment). The same as previous except for missing frame.

Transmit in part III is comparable to Receive though FB details are passed for read not write and frame data is moved the other way (mem to PE instead of PE to mem).

At the end of a cycle FlexRay starts with the next cycle which starts with the first slot again. This is drawn as a 'wrap-back' arrow.

The invention relates to a 3-dimensional mechanism of scheduling/managing Rx/Tx where the 1st dimension is time (FlexRay slots), the 2nd dimension is buffering, and the 3rd dimension is data storage. The approach is build upon dynamism/flexibility. It is both transmission (Tx) and reception (Rx) oriented.

This invention is applicable to any time-triggered protocol like FlexRay. It should be noted that the above scenario depicts one of many possible concurrent approaches and is to be considered as an example. The pictures are not to be interpreted as restricting application of the invention. In particular the invention has been demonstrated using a FlexRay environment. It should be noted that it could be used by any time-triggered protocol.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit of the invention as defined in the following claims

LIST OF REFERENCE SIGNS

100 Communication System Node
10 Host Controller/CPU
12 Communication Controller
  12a Slot Control List Addressing Unit
  12b Buffer Control List Addressing Unit
  12c Buffer Descriptor List Addressing Unit
14 Dedicated Logic
16 Memory
18 General Purpose Logic
20 Dedicated Logic 22 Slot Control List
24 Buffer Control List
26 Buffer Descriptor List
28 Frame Buffer
30 Address Calculation Unit
32 Communication Cycle

The invention claimed is:

1. A system comprising: a host controller; a general memory unit on a host-controller level; a communication controller, wherein a time-triggered protocol launches network activity in predefined time slots; and a storage unit for configuration and buffering related data that is provided outside of the communication controller on a system level, wherein the storage unit further comprises: a slot control list, a buffer control list, a buffer descriptor list, a first address calculation unit provided between the slot control list and the buffer control list, and a second address calculation unit provided between the buffer control list and the buffer descriptor list.

2. The system according to claim 1, wherein the storage unit further comprises: a frame buffer that holds at least frame data.

3. The system according to claim 2, wherein the slot control list provides a definition of both relevance and purpose of communication controller time slots to the system, and holds a logical link.

4. The system according to claim 2, wherein the buffer control list provides a definition of a behavior, holds the status of a buffer, and holds a logical link to the buffer-entries of the buffer.

5. The system according to claim 2, wherein the buffer descriptor list provides a definition of characteristics of a buffer entry and holds a logical link to the frame buffer.

6. The system according to claim 2, wherein the frame buffer provides a storage area that holds at least frame data.

7. The system according to claim 1, wherein the storage unit is general-purpose logic.

8. The system according to claim 1, wherein the storage unit is located inside said general memory unit.

9. The system according to claim 1, wherein the communication controller incorporates a dedicated logic for data retrieval, interpretation, execution, and status update.

10. The system according to claim 2, wherein the communication controller is provided with a slot control list addressing unit linked to the slot control list to address entries in the slot control list.

11. The system according to claim 1, wherein the communication controller is provided with a buffer control list addressing unit to address entries in the buffer control list, wherein the buffer control list addressing unit is linked to said first address calculation unit between the slot control list and the buffer control list.

12. The system according to claim 1, wherein the communication controller is provided with a buffer descriptor list addressing unit to address entries in said buffer descriptor list, wherein the buffer descriptor list addressing unit is linked to said second address calculation unit between the buffer control list and the buffer descriptor list.

13. The system according to claim 1, wherein the communication controller is a FlexRay Data Link Controller.

14. The system according to claim 1, wherein the time-triggered protocol is a FlexRay protocol.

15. A data storage device within a communication system, for configuration and buffering related data that is provided outside of a communication controller on a system level, wherein the communication system is provided with active time slots and at least one logical buffer, the data storage device comprising:
a slot control list to associate communication controller time slots to their respective buffers;
a buffer control list, wherein a buffer control list offset is in a slot control list entry;
a buffer descriptor list, wherein a buffer descriptor list offset is in a buffer control list entry; and a frame buffer that holds at least frame data.

16. A method for data storage for control and buffering related data within a communication system for time-triggered communication protocols, comprising: addressing an entry of a slot control list through a communication controller; linking the slot control list entry to a buffer control list entry to associate a time slot to a buffer, wherein a buffer control list offset is in the slot control list entry; addressing the buffer control list entry through said communication controller; linking the buffer control list entry to a buffer descriptor list entry to associate the buffer to the buffer descriptor list entry, wherein a buffer descriptor list offset is in the buffer control list entry; addressing the buffer descriptor list entry through said communication controller; linking said buffer descriptor list entry to a frame buffer; and addressing the frame buffer through said communication controller.

17. The method of claim 16, wherein accessing said slot control list further comprises: adding an offset associated with a slot control list base address.

18. The method of claim 16, wherein linking said slot control list to the buffer control list further comprises: adding an offset associated with a buffer control list base address in a first address calculation unit.

19. The method of claim 16, wherein linking said buffer control list with said buffer descriptor list further comprises: adding an offset associated with a buffer descriptor list base address in a second address calculation unit.

* * * * *